(12) United States Patent
Wang et al.

(10) Patent No.: US 9,407,835 B2
(45) Date of Patent: Aug. 2, 2016

(54) IMAGE OBTAINING METHOD AND ELECTRONIC DEVICE

(71) Applicants: Beijing Lenovo Software Ltd., Beijing (CN); Lenovo (Beijing) Co., Ltd., Beijing (CN)

(72) Inventors: Wenfeng Wang, Beijing (CN); Nailei Zhang, Beijing (CN); Jiuru Tang, Beijing (CN); Wenhui Chen, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 56 days.

(21) Appl. No.: 14/229,919

(22) Filed: Mar. 30, 2014

(65) Prior Publication Data

US 2014/0313361 A1    Oct. 23, 2014

(30) Foreign Application Priority Data

Apr. 22, 2013   (CN) .......................... 2013 1 0140654

(51) Int. Cl.
*H04N 5/265* (2006.01)
*H04N 5/232* (2006.01)
*H04N 5/262* (2006.01)

(52) U.S. Cl.
CPC ........... *H04N 5/265* (2013.01); *H04N 5/23229* (2013.01); *H04N 5/23245* (2013.01); *H04N 5/2621* (2013.01)

(58) Field of Classification Search
CPC   H04N 5/23245; H04N 5/265; H04N 2101/00
See application file for complete search history.

(56) References Cited

U.S. PATENT DOCUMENTS

| 2004/0197088 A1* | 10/2004 | Ferman et al. ................. 386/117 |
| 2008/0052945 A1* | 3/2008 | Matas et al. .................... 34/173 |

* cited by examiner

*Primary Examiner* — Ahmed A Berhan
(74) *Attorney, Agent, or Firm* — Harness, Dickey & Pierce, P.L.C.

(57) ABSTRACT

An image obtaining method and an electronic device for implementing the method are disclosed. The method includes: capturing M image frames of a first object by the image capturing unit in a first time period, where M is an integer larger than or equal to 2; determining a first region of the i-th image frame of the M image frames based on a first preset rule; obtaining M sub-image frames from the M image frames based on information of the first region, where the i-th sub-image frame of the M sub-image frames is determined based on the i-th image frame and the information of the first region; obtaining the j-th image frame of the M image frames, where j is the same as or different from i; and generating a first dynamic image of the first object by using the j-th image frame and the M sub-image frames.

16 Claims, 3 Drawing Sheets

IMAGE OBTAINING METHOD AND ELECTRONIC DEVICE

The present application claims the priority to Chinese Patent Application No. 201310140654.X, entitled "IMAGE OBTAINING METHOD AND ELECTRONIC DEVICE", filed on Apr. 22, 2013 with the State Intellectual Property Office of People's Republic of China, which is incorporated herein by reference in its entirety.

FIELD

The disclosure relates to the field of computers and embedded technology, and in particular, to an image obtaining method and an electronic device.

BACKGROUND

With the development of science and technology, the electronic technology develops rapidly. There are more and more kinds of electronic products, and accordingly, people benefit from the convenience brought by the development of science and technology. Nowadays, with various electronic devices, people may enjoy a comfortable life brought by the development of science and technology. For example, electronic devices such as cell phones become indispensable in the life of people, with which people may keep in contact with each other via call and message.

Conventionally, after obtaining a series of images, people may make a dynamic image such as a Graphics Interchange Format (gif) image, based on the series of images. A normal video file may have a large size, and the video is difficult to be uploaded to internet, or even can not be uploaded to internet in a case of low speed. However, the gif image usually has a small size, movements in the gif image is less smooth than those in the video, nevertheless, a comic effect is brought by the gif image, and a good visual effect is presented to a user with a simple animation.

Conventionally, after multiple image frames are captured, a gif image may be obtained based on the multiple image frames. Each image frame needs to be processed, and therefore, the work load of the electronic device is heavy. In addition, the user may only intend to pay attention to a dynamic effect of part of the gif image. Taking a gif image showing a person and sceneries as an example, the user may only intend to observe the dynamic effect of the person. However, due to external factors during photographing, for example, hands of a photographer may shake, locations of the sceneries in the obtained multiple image frames may be changed. With a gif image obtained based on the multiple image frames, a dynamic effect of the sceneries may also be presented to the user. Hence, an unnecessary display effect is presented to the user, and the display quality is lowered.

SUMMARY

An image obtaining method and an electronic device are provided according to embodiments of the disclosure, to solve a conventional disadvantage that the work load of the electronic device for obtaining a gif image is heavy and to achieve an effect of reducing the work load of the electronic device.

An image obtaining method applied to an electronic device is disclosed. The electronic device includes an image capturing unit. The method includes:

capturing M image frames of a first object by the image capturing unit in a first time period, where M is an integer larger than or equal to 2;

determining a first region in the i-th image frame of the M image frames based on a first preset rule;

obtaining M sub-image frames from the M image frames based on information of the first region, where the i-th sub-image frame of the M sub-image frames is determined based on the i-th image frame and the information of the first region;

obtaining the j-th image frame of the M image frames, where j is the same as or different from i; and generating a first dynamic image corresponding to the first object by using the j-th image frame and the M sub-image frames.

The capturing M image frames of the first object by the image capturing unit in a first time period includes:

obtaining a first image of the first object by the image capturing unit in the first time period; and obtaining the M image frames based on the first image.

Before the capturing M image frames of the first object by the image capturing unit in a first time period, the method further includes: determining that the electronic device operates in a first operating mode.

The first operating mode is a video capturing mode or a continuous image capturing mode.

The determining a first region in the i-th image frame of the M image frames based on a first preset rule includes:

determining the first region in the i-th image frame based on an operation of a user; or determining the first region in the i-th image frame by analyzing the M image frames; or determining the first region in the i-th image frame by face recognition.

The determining the first region in the i-th image frame based on an operation of a user includes:

determining the first region in the i-th image frame based on a smearing operation of the user; or determining the first region in the i-th image frame based on a circling operation of the user.

The determining the first region in the i-th image frame by analyzing the M image frames includes:

analyzing the M image frames to determine a region in which the M image frames most significantly differ from each other; and determining, in the i-th image frame, the region in which the M image frames most significantly differ from each other as the first region.

The first dynamic image is a gif image.

An electronic device including an image capturing unit is disclosed. The device includes:

a first obtaining unit, adapted to capture M image frames of a first object by the image capturing unit in a first time period, where M is an integer larger than or equal to 2;

a first determination unit, adapted to determine a first region in the i-th image frame of the M image frames based on a first preset rule;

a second obtaining unit, adapted to obtain M sub-image frames from the M image frames based on information of the first region, where the i-th sub-image frame of the M sub-image frames is determined based on the i-th image frame and the information of the first region;

a third obtaining unit, adapted to obtain the j-th image frame of the M image frames, where j is the same as or different from i; and a fourth obtaining unit, adapted to generate a first dynamic image corresponding to the first object by using the j-th image frame and the M sub-image frames.

The first obtaining unit includes a first obtaining sub-unit and a second obtaining sub-unit, the first obtaining sub-unit is adapted to obtain a first image of the first object by the image capturing unit in the first time period, and the second obtaining sub-unit is adapted to obtain the M image frames based on the first image.

The electronic device further includes a second determination unit adapted to determine that the electronic device operates in a first operating mode.

The first operating mode is a video capturing mode or a continuous image capturing mode.

The first determination unit is adapted to determine the first region in the i-th image frame based on an operation of a user; or determine the first region in the i-th image frame by analyzing the M image frames; or determine the first region in the i-th image frame by face recognition.

The first determination unit is adapted to determine the first region in the i-th image frame based on a smearing operation of the user; or determine the first region in the i-th image frame based on a circling operation of the user.

The first determination unit includes a first determination sub-unit and a second determination sub-unit, the first determination sub-unit is adapted to analyze the M image frames to determine a region in which the M image frames most significantly differ from each other, and the second determination sub-unit is adapted to determine, in the i-th image frame, the region in which the M image frames most significantly differ from each other as the first region.

The first dynamic image is a gif image.

The image acquiring method according to the embodiments of the disclosure may be applied to the electronic device. The electronic device may include the image capturing unit. The method may include: in the first time period, capturing M image frames of the first object by the image capturing unit, where M is an integer larger than or equal to 2; determining the first region in the i-th image frame of the M image frames based on a first preset rule; obtaining M sub-image frames from the M image frames based on the information of the first region, where the i-th sub-image frame of the M sub-image frames is determined based on the i-th image frame and the information of the first region; obtaining the j-th image frame of the M image frames, where j is the same as or different from i; and generating the first dynamic image of the first object by using the j-th image frame and the M sub-image frames.

According to the embodiment of the disclosure, after obtaining the M image frames, the first region may be determined in the i-th image frame of the M image frames. After obtaining the first region, the M sub-image frames may be obtained from the M image frames based on the information of the first region. The first dynamic image may be generated by using the j-th image frame of the M image frames and the M sub-image frames. Therefore, the generation of the first dynamic image is not based on all image contents of the M image frames. According to the embodiment of the disclosure, only partial regions of the M image frames are processed. Hence, regions to be processed are smaller, the work load of the electronic device is reduced, and accordingly, the operating efficiency of the electronic device is enhanced and the operating time of a user is decreased.

When observing the first dynamic image, the user mainly pays attention to a dynamic effect of the first dynamic image. According to the embodiment of the disclosure, the first dynamic image is obtained based on regions in the M image frames having the dynamic effect. Consequently, the operating efficiency of the electronic device is improved, and at the same time, the observation of the user is not affected.

DETAILED DESCRIPTION OF EMBODIMENTS

An image acquiring method is provided according to an embodiment of the disclosure. The method may be applied to an electronic device. The electronic device may include an image capturing unit. The method may include: in a first time period, capturing M image frames of a first object by the image capturing unit, where M is an integer larger than or equal to 2; determining a first region in the i-th image frame of the M image frames based on a first preset rule; obtaining M sub-image frames from the M image frames based on information of the first region, where the i-th sub-image frame of the M sub-image frames is determined based on the i-th image frame and the information of the first region; obtaining the j-th image frame of the M image frames, where j is the same as or different from i; and generating a first dynamic image of the first object by using the j-th image frame and the M sub-image frames.

According to the embodiment of the disclosure, after obtaining the M image frames, the first region may be determined in the i-th image frame of the M image frames. After obtaining the first region, the M sub-image frames may be determined from the M image frames based on the information of the first region. The first dynamic image may be generated by using the j-th image frame of the M image frames and the M sub-image frames. Therefore, the generation of the first dynamic image is not based on all image contents of the M image frames. According to the embodiment of the disclosure, only partial regions of the M image frames are processed. Hence, regions to be processed are smaller, the work load of the electronic device is reduced, and accordingly, the operating efficiency of the electronic device is enhanced and the operating time of a user is decreased.

When observing the first dynamic image, the user mainly pays attention to a dynamic effect of the first dynamic image. According to the embodiment of the disclosure, the first dynamic image is generated based on regions in the M image frames having the dynamic effect. Consequently, the operating efficiency of the electronic device is improved, and at the same time, the observation of the user is not affected.

According to the embodiment of the disclosure, the electronic device may be a cell phone, a PAD, a camera, etc. The electronic device may include the image capturing unit. For example, the image capturing unit may be a lens of a cell phone, a PAD, a camera, etc. Alternatively, the electronic device may include no image capturing unit. The electronic device may not have an image capturing function, but can be connected with an image capturing unit.

According to the embodiment of the disclosure, the image capturing unit may be a lens or other function modules having the image capturing function, which is not limited in the disclosure.

Technical solutions of the disclosure are described hereinafter in conjunction with embodiments and drawings.

Figure 1:
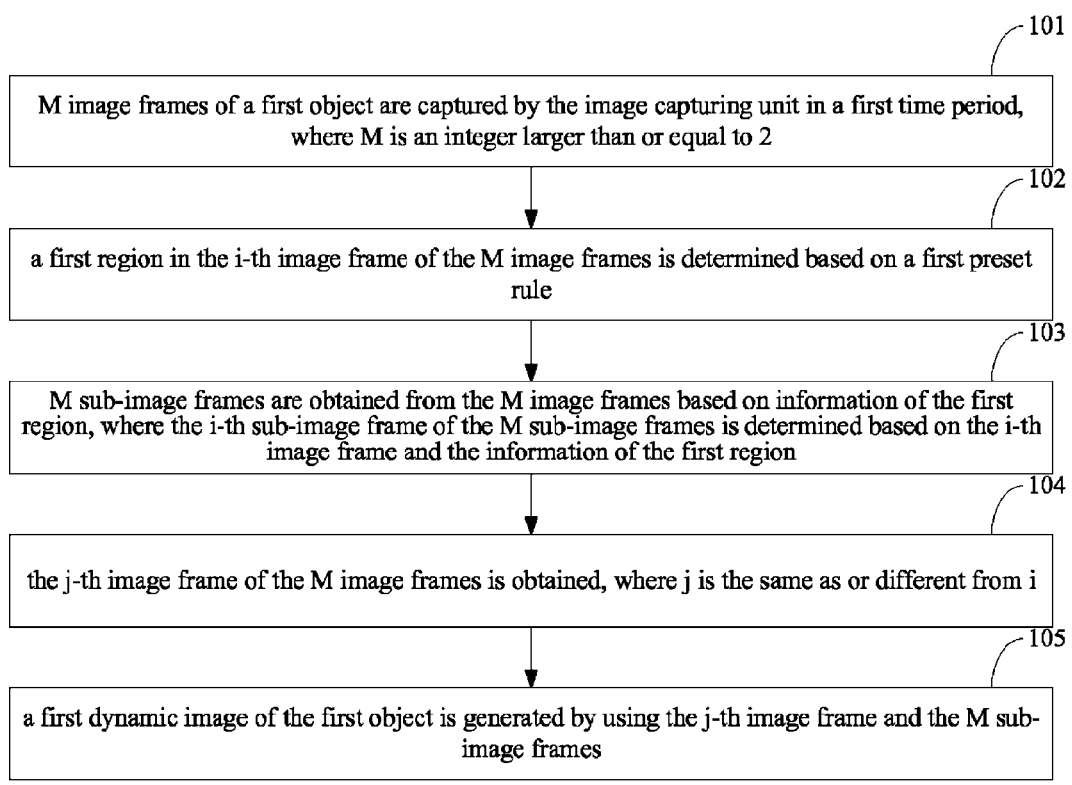
FIG. 1 is a flowchart of an image obtaining method according to an embodiment of the disclosure.

FIG. 1 illustrates an image acquiring method according to an embodiment of the disclosure. The method may be applied to an electronic device. The electronic device may include an image capturing unit. The method includes the following steps S101 to S105.

In step S101, M image frames of a first object are captured by the image capturing unit in a first time period, where M is an integer larger than or equal to 2.

According to the embodiment of the disclosure, in the first time period, the electronic device may obtain, by the image capturing unit, the M image frames of the first object.

According to the embodiment of the disclosure, the image capturing unit may have a capturing region. Only an image of an object located in the capturing region of the image capturing unit can be captured by the image capturing unit. The capturing region of the image capturing unit is referred to as a first capturing region. The electronic device or a user may adjust the first capturing unit as needed. The first object may locate in the first capturing region.

According to the embodiment of the disclosure, the image capturing unit may have various operating modes. For example, in a case that the image capturing unit is a lens, the image capturing unit may have various operating modes such as a normal shooting mode, a continuous image capturing mode, a video capturing mode, etc.

According to the embodiment of the disclosure, before obtaining the M image frames, the electronic device may obtain, by the image capturing unit, a first image of the first object in the first time period.

In addition, according to the embodiment of the disclosure, before the first image of the first object is obtained by the image capturing unit in the first time period, the operating mode of the image capturing unit may be determined. For example, the image capturing unit may be determined as operating in a first operating mode. As described above, the image capturing unit may have various operating modes such as a normal shooting mode, a continuous image capturing mode, a video capturing mode, etc.; therefore, the first operating mode may be any one of these various operating modes.

In a case that the first operating mode is the continuous image capturing mode, the first image may include the M image frames. Each image frame is an image obtained with the continuous image capturing mode.

In a case that the first operating mode is the video capturing mode, the first image may be a video image. The M image frames may be obtained from the first image by analyzing the first image. For example, the M image frames are obtained by decomposing the video or obtained with screenshots of the video.

Step S102 is determining a first region in the i-th image frame of the M image frames based on a first preset rule.

According to the embodiment of the disclosure, after the M image frames are obtained, one image frame may be selected from the M image frames as the i-th image frame.

For example, an arbitrary image frame may be selected from the M image frames as the i-th image frame. Alternatively, a specific image frame may be selected from the M image frames as the i-th image frame.

In a case that a specific image frame is selected from the M image frames as the i-th image frame, in a possible implementation, the i-th image frame may be selected by a user from the M image frames. The i-th image frame may be selected from the M image frames with other approaches.

After the i-th image frame is selected, the first region in the i-th image frame may be determined based on the first preset rule.

There may be different first preset rules, and accordingly, the first region may be determined with different approaches. Several possible approaches are described hereinafter.

In one possible approach, the process of determining the first region based on the first preset rule includes: determining the first region in the i-th image frame based on an operation of the user.

That is, after the i-th image frame is selected, the user may perform an operation on the i-th image frame, and the electronic device may determine the first region in the i-th image frame based on the operation of the user. With the approach, the user may determine a region the user prefers or values as the first region in the i-th image frame. Hence, a finally obtained first dynamic image may better satisfy requirements of the user.

For example, the user may perform a smearing operation. The user may smear a required region, and the smeared region may be regarded as the first region. Alternatively, the user may perform a circling operation. For example, the user may circle a required region, and the circled region may be regard as the first region. The user may perform other operations.

In another possible approach, the process of determining the first region based on the first preset rule includes: analyzing the M image frames to determine the first region in the i-th image frame.

After the M image frames are obtained, the electronic device may analyze the M image frames, and through the analysis, the electronic device may acquire a region in which the M image frames significantly differ from each other.

For example, the electronic device may partition each of the M image frames into N sub-regions with a same partitioning approach, where N is an integer. After the partition of the M image frames, the electronic device may determine, based on the M image frames, a sub-region where the M image frames significantly differ from each other. For example, the electronic device partitions each of the M image frames into four sub-regions with a same partitioning approach. Since the images are partitioned with the same partitioning approach, the sub-regions of one image frame respectively correspond to those of the other image frames. After the partition, the electronic device may determine the sub-region of the four sub-regions in which the M image frames most significantly differ from each other. For example, if it is determined that the M image frames most significantly differ from each other in a first sub-region among the four sub-regions, the electronic device may determine the first sub-region as the first region in the i-th image frame.

With the above approach, the electronic device may automatically recognize the region where the M image frames significantly differ from each other. Accordingly, the first dynamic image may be obtained based on a result of the recognition. The whole process may be automatically performed by the electronic device without user operation. Therefore, the intelligence of the electronic device is improved, and it is convenient for the user since the work load of the user is reduced. In addition, as the region where the M image frames significantly differ from each other is determined by overall analyzing the M image frames, the result of the determination is accurate.

Figure 2A:
FIG. 2A is a schematic diagram of determining a first region in the i-th image frame by face recognition according to an embodiment of the disclosure.

In further another approach, the process of determining the first region based on the first preset rule includes: determining the first region in the i-th image frame by face recognition. As shown in FIG. 2A, the face of a person circled in FIG. 2A represents the first region.

Figure 2B:
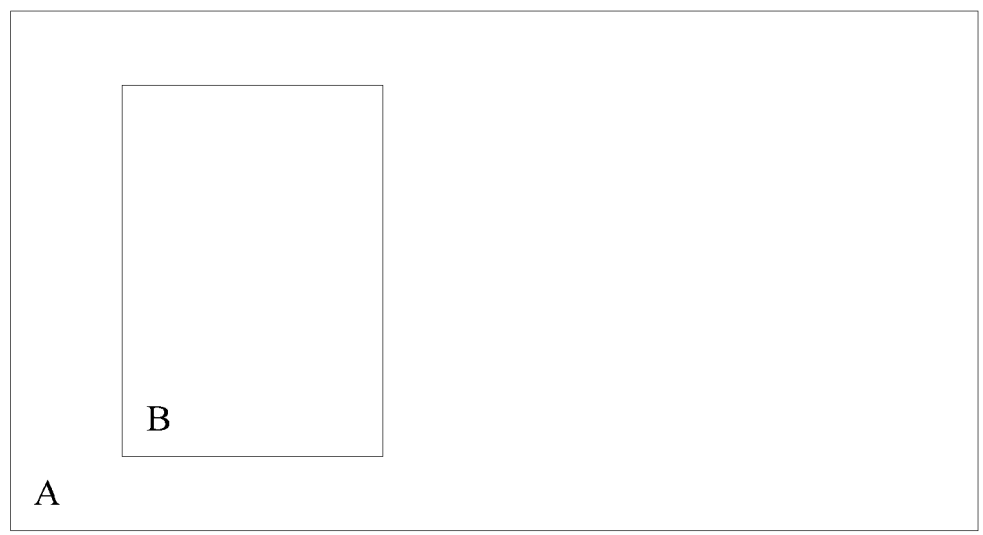
FIG. 2B is a schematic diagram of the i-th image frame according to an embodiment of the disclosure.

For example, the i-th image frame includes a person and sceneries. The electronic device may determine a region of the face of the person in the i-th image frame by the face recognition and determine the region of the face of the person as the first region. As shown in FIG. 2B, the face of the person is determined as the first region.

The above approach is appropriate for a case that the first image includes the person, and particularly for a case that the person has an expressive face, a key of the first image may be well obtained with this approach, and accordingly, a desired display effect of the first image is quickly presented to the user.

According to the embodiment of the disclosure, the process of determining the first region based on the first preset rule may be implemented with approaches different from the forgoing three approaches. Those skilled in the art may acquire the mind of the disclosure based on the description of the three approaches. Hence, other approaches for determining the first region in the i-th image frame should fall within the scope of the disclosure.

Since it is intended to obtain the first dynamic image, and the process of determining the first region in the i-th image frame is intended to achieve a dynamic effect, the first object may be an object moving in the first time period.

Step S103 is obtaining M sub-image frames from the M image frames based on information of the first region, where the i-th sub-image frame of the M sub-image frames is determined based on the i-th image frame and the information of the first region.

According to the embodiment of the disclosure, after the first region in the i-th image frame is determined, first regions in (M−1) image frames different from the i-th image frame are determined based on the first region.

According to the embodiment of the disclosure, after the first region in the i-th image frame is determined, the image in the first region is cropped out of the i-th image frame, here the image of the first region in the i-th image frame is referred to as the i-th sub-image frame.

According to the embodiment of the disclosure, after the first region in the i-th image frame is determined, the first regions in the (M−1) image frames may be determined based on information such as a location relationship between the first region and the i-th image frame. Accordingly, (M−1) sub-image frames are obtained. That is, M sub-image frames may be obtained in total.

For example, as shown in FIG. 2B, the region of the i-th image frame is rectangular, and the first region is also rectangular. As shown in FIG. 2B, the larger rectangle is marked with A, which represents the i-th image frame; while the smaller rectangle is marked with B, which represents the first region in the i-th image frame. The location of the first region in the i-th image frame is clearly shown in FIG. 2B.

Figure 2C:
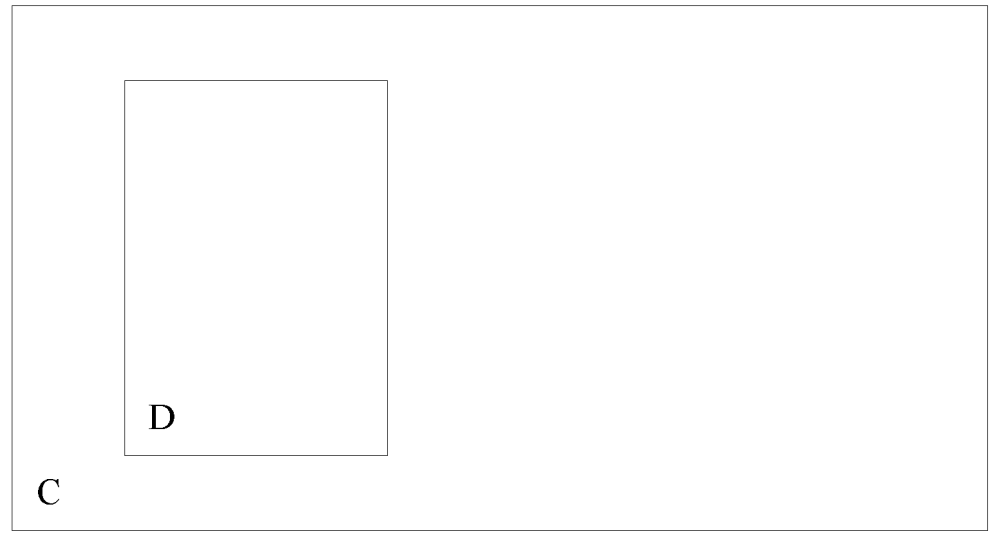
FIG. 2C is a schematic diagram of the j-th image frame according to an embodiment of the disclosure.

FIG. 2C illustrates the j-th image frame of the M image frames, where j is an integer ranging from 1 to M and different from i. That is, the j-th image frame is a different image from the i-th image frame. Similarly, the region of the j-th image frame and the first region in the j-th image frame are shown as rectangles. The M image frames are all obtained from the first image. Preferably, all regions of the M image frames have a same shape and a same size.

As shown in FIG. 2C, the larger rectangle is marked with C, which represents the j-th image frame; while the smaller rectangle is marked with D, which represents the first region in the j-th image frame. The location of the first region in the j-th image frame is clearly shown in FIG. 2C.

As shown in FIG. 2B and FIG. 2C, the location of the first region of the j-th image frame in the j-th image frame is consistent with the location of the first region of the i-th image frame in the i-th image frame.

Hence, after the first region in the i-th image frame is determined, the first regions of the remaining (M−1) image frames may be determined based on the location of the first region of the i-th image frame in the i-th image frame. Accordingly, M first regions may be determined in total, that is, M sub-image frames may be obtained.

Step S104 is obtaining the j-th image frame of the M image frames, where j is the same as or different from i.

According to the embodiment of the disclosure, the j-th image frame of the M image frames may be obtained.

For example, the i-th image frame, which is used to determine the first region, may be taken as the j-th image frame. Alternatively, the j-th image frame may be obtained from the remaining (M−1) image frames.

For example, an arbitrary image frame may be selected from the remaining (M−1) image frames as the j-th image frame; or a specific image frame may be selected from the remaining (M−1) image frames as the j-th image frame.

Step S105 is generating a first dynamic image of the first object by using the j-th image frame and the M sub-image frames.

After the j-th image frame and the M sub-image frames are obtained, the first dynamic image of the first object may be generated by using the j-th image frame and the M sub-image frames.

The process of generating the first dynamic image of the first object by using the j-th image frame and the M sub-image frames may be implemented with many approaches. Several possible approaches are described hereinafter.

In one possible approach, the process of generating the first dynamic image of the first object by using the j-th image frame and the M sub-image frames includes: obtaining the first dynamic image based on M sub-image frames and a second region of the i-th image frame. The i-th image frame may include the first region and the second region, where the second region in the i-th image frame is a remaining region after cropping the first region out of the i-th image frame.

That is, after the M sub-image frames are obtained, the M sub-image frames may be processed to obtain a dynamic image. The second region of the i-th image frame may be cropped out of the i-th image frame. Then the first dynamic image may be obtained by integrating the obtained dynamic image and the image of the second region in the i-th image frame.

With the above approach, the work load of the electronic device is lowered, and the obtained first dynamic image is complete, including not only a dynamic part but also a static part. Accordingly, the dynamic effect is reality and the viewing effect is better. In addition, since the electronic device only needs to crop the second region of the i-th image frame out of the i-th image frame, the operation is simple.

In another possible approach, the process of generating the first dynamic image of the first object by using the j-th image frame and the M sub-image frames includes: determining a second region in the j-th image frame of the M image frames based on the second region in the i-th image frame; and obtaining the first dynamic image based on the M sub-image frames and the second region in the j-th image frame. The j-th image frame is any image frame of the M image frames different from the i-th image frame.

That is, after the M sub-image frames are obtained, the M sub-image frames may be processed to obtain a dynamic image. The j-th image frame may be selected from the M image frames. After the j-th image frame is selected, the second region in the j-th image frame may be determined based on the location of the second region of the i-th image frame in the i-th image frame. Then the first dynamic image may be obtained by integrating the obtained dynamic image and the image of the second region in the j-th image frame.

There are different approaches for selecting the j-th image frame from the M image frames.

For example, any image frame of the M image frames except the i-th image frame may be selected as the j-th image frame. Alternatively, a specific image frame of the M image frames except the i-th image frame may be selected as the j-th image frame.

In a case that a specific image frame of the M image frames is selected as the j-th image frame, one image frame is selected from the M image frames as the j-th image frame based on an operation of the user, where j is not equal to i.

With the above approach, the work load of the electronic device is lowered, and the obtained first dynamic image is complete, including not only a dynamic part but also a static part. Accordingly, the dynamic effect is reality and the viewing effect is better. In addition, different images may be used for determining the dynamic part and the static part, the result of determination is closer to an actual effect. In addition, since the electronic device only needs to crop the second region of the i-th image frame out of the i-th image frame, the operation is simple.

According to the embodiment of the disclosure, a format of the first dynamic image may be gif, that is, the first dynamic image may be a gif image. Alternatively, the first dynamic image may be in other formats.

The image acquiring method provided in the disclosure is described in conjunction with several embodiments. Some possible application scenarios of the method are introduced according to the following embodiments. It should be noted that, the embodiments of the disclosure are intended to explain rather than to limit the disclosure. Variations based on the mind of the disclosure are apparent for those skilled in the art; hence, any other embodiment consistent with the mind of the disclosure should fall in the scope of the disclosure.

A First Embodiment

The electronic device is a cell phone. The electronic device includes an image capturing unit. The image capturing unit is a lens of the cell phone. The cell phone includes a display unit, and the display unit is a display screen of the cell phone.

According to the embodiment of the disclosure, the image capturing unit may have various operating modes. The electronic device may determine that the image capturing unit operates in the first operating mode. According to the embodiment of the disclosure, the first operating mode may be a video capturing mode.

According to the embodiment of the disclosure, after determining that the image capturing unit operates in the first operating mode, the electronic device may obtain, by the image capturing unit, the first image which corresponds to the first capturing region in the first time period. According to the embodiment of the disclosure, as the first operating mode is the video capturing mode, the obtained first image may be a video.

After obtaining the first image, the electronic device may process the first image. According to the embodiment of the disclosure, the electronic device processes the video, and six image frames are obtained based on the video. According to the embodiment of the disclosure, the first image is the video, i.e., the first image may be a dynamic image, and the six image frames obtained based on the first image are static images.

According to the embodiment of the disclosure, after the six image frames are obtained, one image frame may be selected from the six image frames as the i-th image frame.

According to the embodiment of the disclosure, an arbitrary image frame is selected from the M image frames as the i-th image frame. For example, a first image frame of the six image frames is selected as the i-th image frame.

After the i-th image frame is selected, the first region in the i-th image frame may be determined based on the first preset rule. According to the embodiment of the disclosure, a first region in the first image frame is determined based on the first preset rule.

According to the embodiment of the disclosure, the first region in the i-th image frame may be determined through a smearing operation of the user.

After the first image frame is selected, the user may perform an operation on the first image frame, and the electronic device may determine the first region in the first image frame based on the operation of the user. Accordingly, the user may obtain the i-th sub-image frame. With the approach, the user may determine a region the user prefers or values as the first region in the first image frame. Hence, the finally obtained first dynamic image may better satisfy requirements of the user.

Since it is intended to obtain the first dynamic image, and the process of determining the first region in the first image frame is intended to achieve a dynamic effect, the first object included in the first region in the first image frame may be an object moving in the first time period. According to the embodiment of the disclosure, the first object may be a person.

According to the embodiment of the disclosure, after the first region in the first image frame is determined, first regions of remaining (M−1) image frames different from the first image frame are determined based on the location of the first region with respect to the first image frame. Accordingly, M first regions may be determined in total. According to the embodiment of the disclosure, six first regions are determined in total, that is, six sub-image frames are obtained.

After the six sub-image frames are obtained, the first dynamic image of the first object is obtained at least based on the six sub-image frames.

According to the embodiment of the disclosure, the first dynamic image is obtained based on the six sub-image frames and the second region of the first image frame. The first image frame may include the first region and the second region, where the second region is a remaining region in the first image frame after cropping the first region out of the first image frame.

That is, after the six sub-image frames are obtained, the six sub-image frames may be processed to obtain a dynamic image. The second region of the first image frame may be cropped out of the first image frame. Then the first dynamic image may be obtained by integrating the obtained dynamic image and the image of the second region in the first image frame.

According to the embodiment of the disclosure, the first dynamic image is a gif image.

A Second Embodiment

The electronic device is a PAD. The electronic device includes no image capturing unit, while the electronic device may communicate with an image capturing unit. The image capturing unit is a lens. The image capturing unit and the electronic device are two independent devices. The PAD includes a display unit, and the display unit is a display screen of the PAD.

According to the embodiment of the disclosure, the image capturing unit may have various operating modes. The electronic device may determine that the image capturing unit operates in the first operating mode. According to the embodiment of the disclosure, the first operating mode may be the video capturing mode.

According to the embodiment of the disclosure, after determining that the image capturing unit operates in the first operating mode, the electronic device may obtain, by the image capturing unit, the first image which corresponds to the first capturing region in the first time period. According to the embodiment of the disclosure, as the first operating mode is the video capturing mode, the obtained first image may be a video.

After obtaining the first image, the electronic device may process the first image. According to the embodiment of the disclosure, the electronic device processes the video, and six image frames are obtained based on the video. According to the embodiment of the disclosure, the first image is the video, i.e., the first image may be a dynamic image, and the six image frames obtained based on the first image are static images.

According to the embodiment of the disclosure, after the six image frames are obtained, one image frame may be selected from the six image frames as the i-th image frame.

According to the embodiment of the disclosure, a specific image frame is selected from the M image frames as the i-th image frame. For example, a first image frame of the six image frames is selected as the i-th image frame through an operation of the user.

According to the embodiment of the disclosure, the M image frames are analyzed to determine the first region in the i-th image frame. The first region in the first image frame is determined based on the first preset rule.

The electronic device may partition each of the six image frames into N sub-regions with a same partitioning approach, where N is an integer. After the partition of each of the six image frames, the electronic device may determine, based on the six image frames, a sub-region where the six image frames significantly differ from each other.

For example, N is suggested as 4, that is, the electronic device partitions each of the six image frames into four sub-regions with a same partitioning approach. Since the images are partitioned with the same partitioning approach, the location of the sub-regions in one image frame respectively correspond to those in the other image frames. After the partition, the electronic device may determine a sub-region of the four sub-regions in which the six image frames most significantly differ from each other. For example, if it is determined that the six image frames most significantly differ from each other in a first sub-region among the four sub-regions, the electronic device may determine the first sub-region as the first region in the i-th image frame, that is, the electronic device determines the first sub-region as the first region in the first image frame, and accordingly, a first sub-image frame is obtained.

Since it is intended to obtain the first dynamic image, and the process of determining the first region in the first image frame is intended to achieve a dynamic effect, the first object included in the first region in the first image frame may be an object moving in the first time period. According to the embodiment of the disclosure, the first object may be a person.

According to the embodiment of the disclosure, after the first region in the first image frame is determined, first regions of remaining (M−1) image frames different from the first image frame are determined based on the location of the first region of the first image frame with respect to the first image frame. Accordingly, M first regions may be determined in total. According to the embodiment of the disclosure, six first regions are determined in total, that is, six sub-image frames are obtained.

According to the embodiment of the disclosure, a second region in the j-th image frame of the M image frames is determined based on the second region in the i-th image frame. The j-th image frame is any image frame of the M image frames except the i-th image frame. Then after the second region in the j-th image frame is determined, the first dynamic image may be obtained based on the M sub-image frames and the determined second region in the j-th image frame.

That is, after the M sub-image frames are obtained, the M sub-image frames may be processed to obtain a dynamic image. The j-th image frame may be selected from the M image frames. After the j-th image frame is selected, the second region in the j-th image frame of the M image frame may be determined based on the location of the second region of the i-th image frame in the i-th image frame. Then the first dynamic image may be obtained by integrating the obtained dynamic image and the image of the second region in the j-th image frame.

According to the embodiment of the disclosure, any image frame of the M image frames except the i-th image frame may be selected as the j-th image frame.

According to the embodiment of the disclosure, the first dynamic image is a gif image.

A Third Embodiment

The electronic device is a camera. The electronic device includes an image capturing unit. The image capturing unit is a lens of the camera. The camera includes a display unit, and the display unit is a display screen of the camera.

According to the embodiment of the disclosure, the image capturing unit may have various operating modes. The electronic device may determine that the image capturing unit operates in the first operating mode. According to the embodiment of the disclosure, the first operating mode may be a video capturing mode.

According to the embodiment of the disclosure, after determining that the image capturing unit operates in the first operating mode, the electronic device may obtain, by the image capturing unit, the first image which corresponds to the first capturing region in the first time period. According to the embodiment of the disclosure, as the first operating mode is the video capturing mode, the obtained first image may be a video.

After obtaining the first image, the electronic device may process the first image. According to the embodiment of the disclosure, the electronic device processes the video, and six image frames are obtained based on the video. According to the embodiment of the disclosure, the first image is the video, i.e., the first image may be a dynamic image, and the six image frames obtained based on the first image are static images.

According to the embodiment of the disclosure, after the six image frames are obtained, one image frame may be selected from the six image frames as the i-th image frame.

According to the embodiment of the disclosure, a specific image frame is selected from the M image frames as the i-th image frame. For example, a first image frame of the six image frames is selected as the i-th image frame through an operation of the user.

According to the embodiment of the disclosure, the first region in the i-th image frame is determined through face recognition. The first region in the first image frame is determined through face recognition.

For example, the first image frame includes a person and sceneries. The electronic device may determine a region of the face of the person in the first image frame through the face recognition and determine the region of the face of the person as the first region.

Since it is intended to obtain the first dynamic image, and the process of determining the first region in the first image frame is intended to achieve a dynamic effect, the first object included in the first region in the first image frame may be an object moving in the first time period. According to the embodiment of the disclosure, the first object may be a person.

According to the embodiment of the disclosure, after the first region in the first image frame is determined, first regions of remaining (M−1) image frames different from the first image frame are determined based on the location of the first region of the first image frame in the first image frame. Accordingly, M first regions may be determined in total. According to the embodiment of the disclosure, six first regions are determined in total, that is, six sub-image frames are obtained.

After the six sub-image frames are obtained, the first dynamic image of the first object is obtained at least based on the six sub-image frames.

According to the embodiment of the disclosure, a second region in the j-th image frame of the M image frames is determined based on the second region in the i-th image frame. The j-th image frame is any image frame of the M image frames different from the i-th image frame. Then after the second region in the j-th image frame is obtained, the first dynamic image may be obtained based on the M first regions and the determined second region of the j-th image frame.

That is, after the M sub-image frames are obtained, the M sub-image frames may be processed to obtain a dynamic image. The j-th image frame may be selected from the M image frames. After the j-th image frame is selected, the second region in the j-th image frame may be determined based on the location of the second region of the i-th image frame in the i-th image frame. Then the first dynamic image may be obtained by integrating the obtained dynamic image and the image of the second region in the j-th image frame.

According to the embodiment of the disclosure, any image frame of the M image frames except the i-th image frame may be selected as the j-th image frame.

According to the embodiment of the disclosure, the first dynamic image is a gif image.

Figure 3:
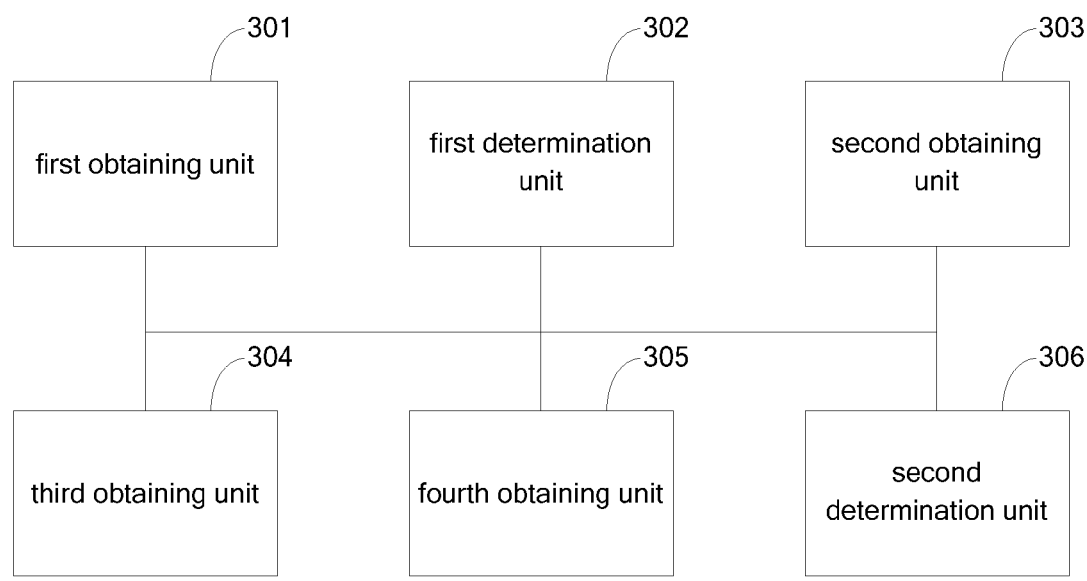
FIG. 3 is a schematic structure diagram of an electronic device according to an embodiment of the disclosure.

An electronic device including an image capturing unit is provided according to an embodiment of the disclosure. As shown in FIG. 3, the electronic device may include: a first obtaining unit 301, a first determination unit 302, a second obtaining unit 303, a third obtaining unit 304 and a fourth obtaining unit 305.

The electronic device may further include a second determination unit 306.

The first obtaining unit 301 may be adapted to capture M image frames of a first object by the image capturing unit in a first time period, where M is an integer larger than or equal to 2.

The first obtaining unit 301 may include a first obtaining sub-unit and a second obtaining sub-unit.

The first obtaining sub-unit may be adapted to obtain, by the image capturing unit, a first image of the first object in the first time period.

The second obtaining sub-unit may be adapted to obtain the M image frames based on the first image.

The first determination unit 302 may be adapted to determine a first region in the i-th image frame of the M image frames based on a first preset rule.

The first determination unit 302 may be adapted to determine the first region in the i-th image frame based on an operation of a user; or determine the first region in the i-th image frame by analyzing the M image frames; or determine the first region in the i-th image frame through face recognition.

The determination unit 302 may be adapted to determine the first region in the i-th image frame based on a smearing operation of the user; or determine the first region in the i-th image frame based on a circling operation of the user.

The determination unit 302 may include a first determination sub-unit and a second determination sub-unit.

The first determination sub-unit may be adapted to analyze the M image frames to determine a region where the M image frames most significantly differ from each other.

The second determination sub-unit may be adapted to determine a region where the M image frames most significantly differ from each other as the first region in the i-th image frame.

The second obtaining unit 303 may be adapted to obtain M sub-image frames from the M image frames based on information of the first region, where the i-th frame sub-image of the M sub-image frames is determined based on the i-th image frame and the information of the first region.

The third obtaining unit 304 may be adapted to obtain the j-th image frame of the M image frames, where j is the same as or different from i.

The fourth obtaining unit 305 may be adapted to generate a first dynamic image of the first object by using the j-th image frame and the M sub-image frames.

The second determination unit 306 may be adapted to determine that the electronic device operates in a first operating mode.

According to the embodiment of the disclosure, the first operating mode is a video capturing mode or a continuous image capturing mode.

According to the embodiment of the disclosure, the first dynamic image is a gif image.

The image obtaining method according to the embodiments of the disclosure may be applied to the electronic device. The electronic device may include the image capturing unit. The method may include: capturing the M image frames of the first object by the image capturing unit in the first time period, where M is an integer larger than or equal to 2; determining the first region in the i-th image frame of the M image frames based on the first preset rule; obtaining the M sub-image frames from the M image frames based on the information of the first region, where the i-th sub-image frame of the M sub-image frames is determined based on the i-th image frame and the information of the first region; obtaining the j-th image frame of the M image frames, where j is the same as or different from i; and generating the first dynamic image of the first object by using the j-th image frame and the M sub-image frames.

According to the embodiment of the disclosure, after obtaining the M image frames, the first region may be determined from the i-th image frame of the M image frames. After obtaining the first region, the M sub-image frames may be determined from the M image frames based on the information of the first region. The first dynamic image may be generated by using the j-th image frame of the M image frames and the M sub-image frames. Therefore, the generation of the first dynamic image is not based on all image contents of the M image frames. According to the embodiment of the disclosure, only partial regions of the M image frames are processed. Hence, regions to be processed are smaller, the work load of the electronic device is reduced, and accordingly, the operating efficiency of the electronic device is enhanced and the operating time of a user is decreased.

When observing the first dynamic image, the user mainly pays attention to a dynamic effect of the first dynamic image. According to the embodiment of the disclosure, the first dynamic image is obtained based on regions in the M image frames having the dynamic effect. Consequently, the operating efficiency of the electronic device is improved, and at the same time, the observation of the user is not affected.

It should be understood by those skilled in the art that, the embodiments according to the present disclosure may be implemented as a method, system or computer program product. Hence, the embodiments of the invention may be implemented with hardware only, with software only, or with a combination of hardware and software. Furthermore, the embodiments of the present disclosure may be embodied as computer program products implemented on one or multiple computer readable media (including but not limited to magnetic disk storage, CD-ROM, optical storage, etc.) including computer executable codes.

The description in this disclosure is made in conjunction with flowchart(s) and/or block diagram(s) of the method, device (system) or computer program product according to the embodiments of the disclosure. It should be understood that each process in the flowchart and/or each block in the block diagram and any combination of processes and/or blocks in the flowchart and/or the block diagram may be implemented through computer program instructions. The computer instructions may be provided to a processor of a general-purpose computer, dedicated computer, embedded processing machine or any other programmable data processing device to generate a machine, in which device(s) to implement functions specified in one or more processes of the flowchart and/or one or more blocks of the block diagram are implemented through executing the instructions by the computer or any other programmable data processing device.

The computer program instructions may further be stored in a computer readable storage which may lead the computer or any other programmable data processing device to operation in particular manner in order that a product including an instruction device is generated according to the instructions stored in the computer readable storage, where the instruction device is configured to implement the functions specified in one or more processes of the flowchart and/or one or more blocks of the block diagram.

The computer program instructions may further be loaded to the computer or any other programmable data processing device in order that a series of steps are executed on the computer or any other programmable data processing device to generate processes implemented by the computer, and the steps to implement the functions specified in one or more processes of the flowchart and/or one or more blocks of the block diagram are provided by the instructions executed on the computer or any other programmable data processing device.

Obviously, various alterations and variations may be made by those skilled in the art without departing form the spirit and scope of the disclosure. Hence, the disclosure is intended to include all the alterations and variations falling in the scope of the disclosure or equivalent technologies.

The invention claimed is:

1. An image obtaining method applied to an electronic device, wherein the electronic device comprises an image capturing device, the method comprising:
    capturing M image frames of a first object by the image capturing device in a first time period, wherein M is an integer larger than or equal to 2;
    determining a first region in an i-th image frame of the M image frames based on a first preset rule;
    obtaining M sub-image frames from the M image frames based on information of the first region, wherein an i-th sub-image frame of the M sub-image frames is determined based on the i-th image frame and the information of the first region;
    obtaining a j-th image frame of the M image frames; and
    generating a first dynamic image of the first object by using the j-th image frame and the M sub-image frames,
    wherein i and j are each integers larger than or equal to 1 and smaller than or equal to M.

2. The method according to claim 1, wherein capturing the M image frames of the first object by the image capturing device in the first time period comprises:
    obtaining a first image of the first object by the image capturing device in the first time period; and
    obtaining the M image frames based on the first image.

3. The method according to claim 1, wherein before capturing the M image frames of the first object by the image capturing device in the first time period, the method further comprises:
    determining whether the electronic device operates in a first operating mode.

4. The method according to claim 3, wherein the first operating mode is a video capturing mode or a continuous image capturing mode.

5. The method according to claim 1, wherein determining the first region in the i-th image frame of the M image frames based on the first preset rule comprises:
    determining the first region in the i-th image frame based on an operation of a user; or
    determining the first region in the i-th image frame by analyzing the M image frames; or
    determining the first region in the i-th image frame by face recognition.

6. The method according to claim 5, wherein determining the first region in the i-th image frame based on the operation of the user comprises:
    determining the first region in the i-th image frame based on a smearing operation of the user; or
    determining the first region in the i-th image frame based on a circling operation of the user.

7. The method according to claim 5, wherein determining the first region in the i-th image frame by analyzing the M image frames comprises:
    analyzing the M image frames to identify a region that includes most information changes among the M image frames; and
    determining the identified as the first region in the i-th image frame.

8. The method according to claim 1, wherein the first dynamic image is a Graphics Interchange Format (gif) image.

9. An electronic device comprising an image capturing device, wherein the electronic device comprises a processor and a non-transitory processor-readable medium having processor-executable instructions stored thereon that, when executed by the processor, cause the electronic device to:

capture M image frames of a first object by the image capturing device in a first time period, wherein M is an integer larger than or equal to 2;

determine a first region in an i-th image frame of the M image frames based on a first preset rule;

obtain M sub-image frames from the M image frames based on information of the first region, wherein an i-th sub-image frame of the M sub-image frames is determined based on the i-th image frame and the information of the first region;

obtain a j-th image frame of the M image frames; and generate a first dynamic image corresponding to the first object by using the j-th image frame and the M sub-image frames, wherein i and j are each integers larger than or equal to 1 and smaller than or equal to M.

10. The electronic device according to claim 9, wherein the instructions causing the electronic device to capture M image frames of a first object by the image capturing device in a first time period comprises: instructions causing the electronic device to obtain a first image of the first object by the image capturing device in the first time period, and obtain the M image frames based on the first image.

11. The electronic device according to claim 9, wherein the instructions further cause the electronic device to determine whether the electronic device operates in a first operating mode.

12. The electronic device according to claim 11, wherein the first operating mode is a video capturing mode or a continuous image capturing mode.

13. The electronic device according to claim 9, wherein the instructions causing the electronic device to determine a first region in an i-th image frame of the M image frames based on a first preset rule comprises: instructions causing the electronic device to determine the first region in the i-th image frame based on an operation of a user; or determine the first region in the i-th image frame by analyzing the M image frames; or determine the first region in the i-th image frame by face recognition.

14. The electronic device according to claim 13, wherein the instructions causing the electronic device to determine a first region in an i-th image frame of the M image frames based on a first preset rule comprises: instructions causing the electronic device to determine the first region in the i-th image frame based on a smearing operation of the user; or determine the first region in the i-th image frame based on a circling operation of the user.

15. The electronic device according to claim 13, wherein the instructions causing the electronic device to determine a first region in an i-th image frame of the M image frames based on a first preset rule comprises: instructions causing the electronic device to analyze the M image frames to identify a region that includes most information changes among the M image frames, and determine the identified as the first region in the i-th image frame.

16. The electronic device according to claim 9, wherein the first dynamic image is a gif image.

* * * * *